Dec. 26, 1950 A. C. DYER Re. 23,312

CONTROL MEANS FOR DYNAMIC BRAKING

Original Filed July 9, 1947 3 Sheets-Sheet 1

INVENTOR.
ALVIN C. DYER
BY
Oberlin & Limbach
ATTORNEYS.

CONTROL MEANS FOR DYNAMIC BRAKING

Original Filed July 9, 1947 3 Sheets-Sheet 2

INVENTOR.
ALVIN C. DYER
BY
Oberlin & Limbach
ATTORNEYS.

CONTROL MEANS FOR DYNAMIC BRAKING

Original Filed July 9, 1947 3 Sheets-Sheet 3

INVENTOR.
ALVIN C. DYER
BY
Oberlin & Limbach
ATTORNEYS.

Reissued Dec. 26, 1950 Re. 23,312

UNITED STATES PATENT OFFICE 23,312

CONTROL MEANS FOR DYNAMIC BRAKING

Alvin C. Dyer, Shaker Heights, Ohio, assignor to The Electric Controller & Manufacturing Co., Cleveland, Ohio, a corporation of Ohio Original No. 2,497,492, dated February 14, 1950, Serial No. 759,817, July 9, 1947. Application for reissue April 12, 1950, Serial No. 155,541

21 Claims. (Cl. 318—57)

Matter enclosed in heavy brackets [ ] appears in the original patent but forms no part of this reissue specification; matter printed in italics indicates the additions made by reissue

This invention relates to control systems for parallel connected series motors which provide for dynamic braking automatically regardless of the direction of rotation of the motors, and more particularly to a motor control system which permits operation of less than all of a group of series motors while maintaining operative automatic means for effecting dynamic braking of the motors being operated.

If a separate controller is used to control each motor of a group of series motors for operation in parallel with each other, four contacts are required to complete the dynamic braking circuits for each motor when braking is to be produced by all of the motors from either direction of rotation. Consequently, when two separate controllers are used to control two series motors for operation in parallel with each other, a total of eight contacts [are] *is* required to complete the dynamic braking circuits. Four of these contacts close to complete the braking circuits after forward operation of the motors and the other four close to complete the braking circuits after reverse operation of the motors.

For reasons of economy, simplicity, and space-saving it is desirable to use as few dynamic braking contacts as possible whether of the mechanical or electronic type. This is particularly important for automatic operation because then the dynamic braking contacts are preferably contacts of spring-closing electromagnet contactors which, as most commonly manufactured, are single pole contactors. Consequently, a material reduction in the number of dynamic braking contacts results in a much smaller and considerably less expensive controller.

Control systems are known, for example such as described in North Patent No. 1,699,748, for dynamically braking a pair of direct current series motors by completing two closed loops each including the field winding of one motor and the armature winding of the other motor. As a result of such interconnection of the two motors, the number of contacts required to complete the dynamic braking circuits for braking of the motors after operation in either direction is reduced from the usual eight to but four. If an even number of motors greater than two are to be operated in parallel with each other, the motors may be grouped in pairs to permit interconnection of the motors of each pair for braking purposes. Four dynamic braking contacts are required for each pair of motors so that, if four motors are used, a total of eight dynamic braking contacts is required. The controller of the present invention may be used to control two or more motors and requires a maximum of only four contacts to complete the dynamic braking circuits for braking from either direction of rotation.

A further disadvantage of dynamic braking control systems in which the motors are so interconnected that one motor supplies excitation current for the other is that in the event of failure and consequent disconnection of one of the two motors of a pair, the remaining motor when operated alone cannot be stopped by dynamic braking. In many applications requiring the use of two or more series motors, such as for example the bridge drive of traveling cranes, it is desirable to have available dynamic braking action even though one or more of the motors is disconnected. The motors of the present invention are so connected that each motor supplies its own excitation during dynamic braking thereby permitting one or more of the motors to be disconnected without disturbing the dynamic braking action of the remaining motors.

It is an object of this invention to provide an improved dynamic braking control system for two or more parallel connected direct current motors having series field windings.

Another object is to provide an improved control system for a plurality of direct current motors having series field windings that is capable of rendering all or less than all of the motors effective for dynamic braking when operating in either direction.

Another object is to provide a control system for dynamically braking two or more direct current series motors from either direction of rotation which requires only four contacts to complete the dynamic braking circuits.

Another object is to provide an improved motor control system which is operative regardless of the direction of motor rotation to complete a dynamic braking circuit for one of two series motors if the other motor is disconnected.

Another object is to provide a motor control system for dynamically braking two or more direct current series motors from either direction of rotation which requires only four contacts to complete the dynamic braking circuits and which permits disconnection of one or more of the motors without disturbing the dynamic braking circuits for the remaining motors.

Another object is to provide an improved motor control system comprising means for disconnecting one or more motors of a group of parallel connected direct current series motors arranged for dynamic braking without disturbing the dynamic braking circuit of the unconnected motors.

Another object is to provide cross-connections between like potential points in the circuits of two or more parallel connected direct current series motors which cross-connections permit a reduction in the number of contacts required to connect the motors for dynamic braking from either direction of rotation.

A further object is to provide an improved means for limiting the dynamic braking torque of a direct current motor.

A further object is to provide a dynamic braking control system for a direct current series motor which includes a series-wound, normally-closed contactor and associated resistor for graduating automatically the dynamic braking torque.

A more detailed object is to provide a control system for a group of direct current motors which connects the motors as series machines for operation in parallel with each other with the terminals of like polarity of the armature windings as substantially the same potential and terminals of like polarity of the field windings at substantially the same potential, and which includes armature cross-connections between the terminals of like polarity of the armature windings and field cross-connections between the terminals of like polarity of the field windings which cross-connections are selectively interconnected with each other for braking by contacts rendered operative selectively depending upon the direction of motor rotation.

A controller built in accordance with this invention includes means for connecting the several motors of a group of direct current series motors in parallel across a source of power with each motor in series with its own accelerating and plugging resistor. The motor connections are such that like polarity terminals of the several armature windings are at substantially the same potential and that like polarity terminals of the several field windings are at substantially the same potential. Cross-connections connect the like polarity terminals of the armature and field windings to common junction points, respectively. These cross-connections become parts of the dynamic braking circuits which are completed by connections between selected pairs of the common junction points of the several cross-connections. The proper connections between the several cross-connections may be selected automatically in dependence upon the direction of rotation of the motors by a plurality of spring-closing contactors responsive to the counter voltage of one of the motors. Cut-out knife switches are provided on the controller and are so arranged that any motor may be disconnected without disturbing the dynamic braking circuits for the remaining motors.

Other objects and advantages of this invention will become apparent from the following description wherein reference is made to the drawings, in which Fig. 1 diagrammatically shows a pair of motors connected to a common load;

Figure 3:
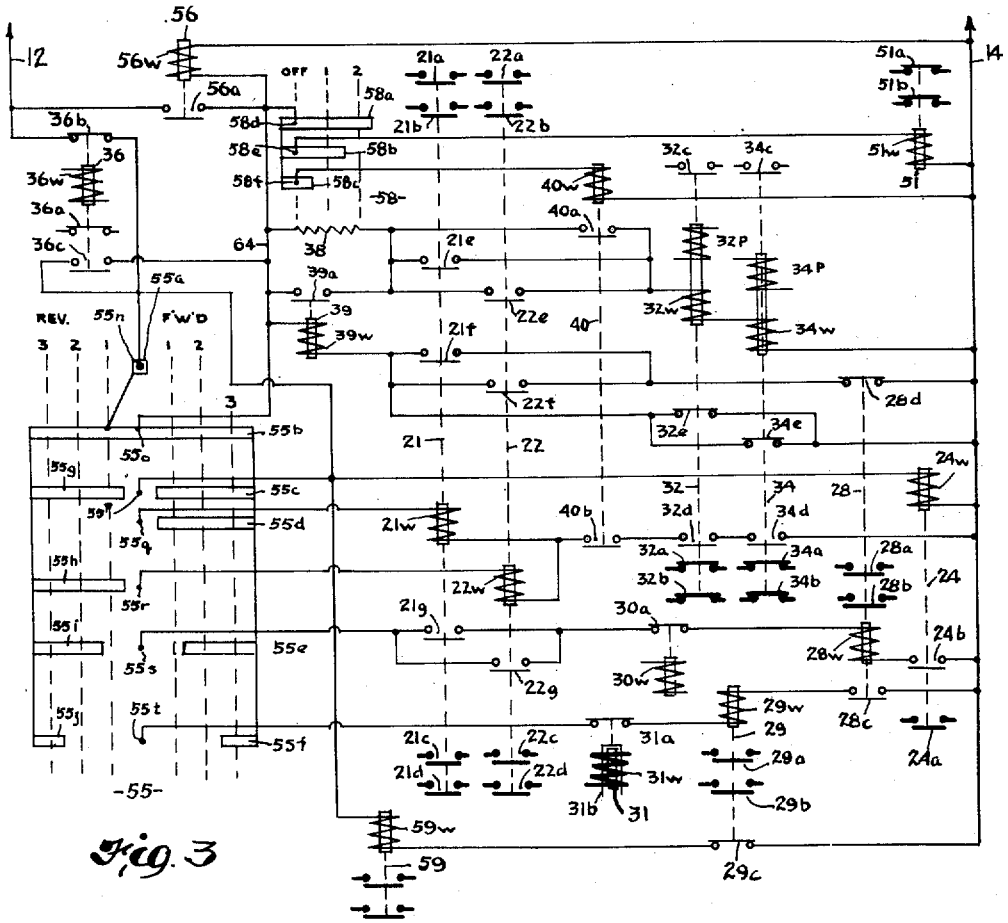
Fig. 3 is a wiring diagram showing the remaining control circuits of the preferred embodiment.
Figure 2:
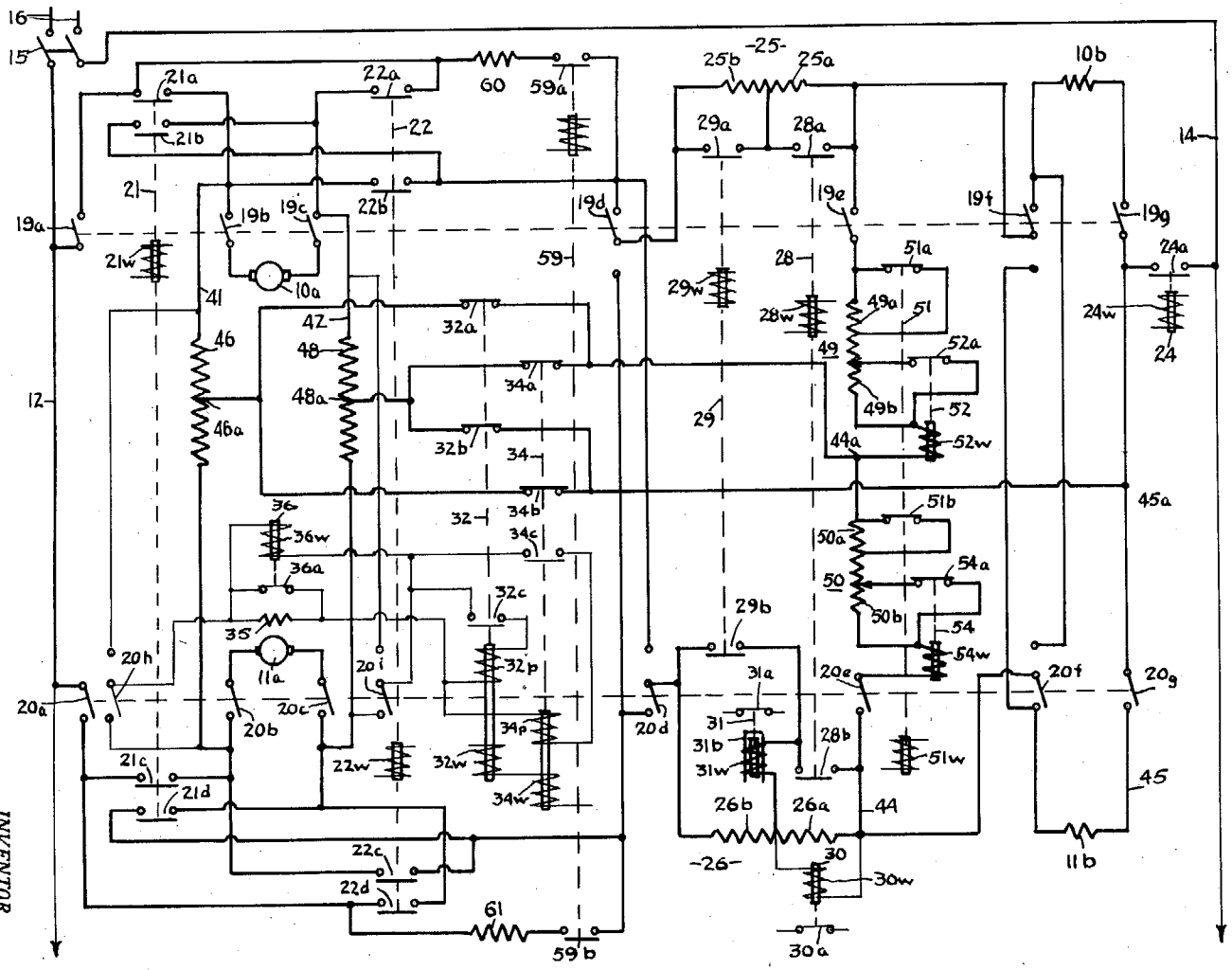
Fig. 2 is a wiring diagram illustrating the power circuits and some of the control circuits of a preferred embodiment of the invention arranged for controlling the two motors of Fig. 1.

Figs. 2 and 3 when combined illustrate a complete motor control system. Some of the contactors and relays of Fig. 2 are shown incompletely in Fig. 2, but all contactors and relays shown in Fig. 3 are shown completely in that figure, and the contactors and relays that are shown incompletely in Fig. 2 are shown completely in Fig. 3.

As illustrated in Figs. 1 to 6, a control system in accordance with this invention is arranged to control a pair of reversible direct current series motors 10 and 11 (Fig. 1) to be operated in parallel with each other for driving a common load 13. The motor 10 has an armature winding 10a (Figs. 1 and 2) and a series field winding 10b and the motor 11 has an armature winding 11a and a series field winding 11b. Although the motors illustrated are series machines, it will be understood that the system can control compound motors as well.

Power may be supplied to the motors 10 and 11 from the conductors 12 and 14 (Fig. 2) which are arranged to be connected by a two-pole knife switch 15 to a suitable source of power represented by the conductors 16. To permit selective operation of either motor alone or both motors together, suitable switching means such as knife switches 19 and 20 are provided. The knife switch 19 is associated with the motor 10 and has poles 19a to 19g inclusive, the poles 19d and 19f being double-throw. The knife switch 20 is associated with the motor 11 and has poles 20a to 20i, inclusive, the poles 20d, 20f, 20h, and 20i being double-throw.

To permit the control system to be arranged so that the motors 10 and 11 may be easily and automatically disconnected from the power source upon a decrease in the supply voltage or upon an overload, a plurality of electromagnetic contactors 21, 22, and 24 are provided for reversibly connecting the motors 10 and 11 in parallel with each other between the conductors 12 and 14. The contactor 21 has four normally open main contacts 21a, 21b, 21c, and 21d and the contactor 22 has four normally open main contacts 22a, 22b, 22c, and 22d. The contacts 21a and 21b when closed connect the armature winding 10a for forward rotation of the motor 10 and the contacts 21c and 21d when closed connect the armature winding 11a for forward rotation of the motor 11. Similarly, the contacts 22a and 22b when closed connect the armature winding 10a for reverse rotation of the motor 10 and the contacts 22c and 22d when closed connect the armature winding 11a for reverse rotation of the motor 11. Although, as shown in Fig. 2, the current in the armature windings 10a and 11b is reversed to effect reversal of the motors, it will be apparent that the control system could also be arranged to reverse instead the current in the field windings 10b and 11b. The contactor 24 has a normally open main contact 24a which when closed connects the motors 10 and 11 to the conductor 14. The contactors 21, 22, and 24 have operating windings 21w, 22w, and 24w, respectively. As shown in Fig. 3, the contactor 21 has normally open auxiliary contacts 21e, 21f, and 21g, and likewise normally open auxiliary contacts 22e, 22f, and 22g are provided on the contactor 22. The contactor 24 has a normally open auxiliary contact 24b.

Acceleration and plugging as well as the speed of the motors 10 and 11 may be controlled by suitable means such as the series resistors 25 and 26, respectively. Plugging sections 25a and 26a of the resistors 25 and 26, respectively, are arranged to be short circuited concurrently upon closure of main contacts 28a and 28b, respectively, of an electromagnetic plugging contactor 28 having an operating winding 28w. The contactor 28 has a normally open auxiliary contact 28c and a normally closed auxiliary contact 28d. Accelerating sections 25b and 26b of the resistors 25 and 26, respectively, are arranged to be short circuited concurrently upon closure of main contacts 29a and 29b, respectively, of an electromagnetic accelerating contactor 29 having an operating winding 29w and a normally closed auxiliary contact 29c. Additional accelerating resistor sections and contactors may be provided if desired.

Operation of the contactor 28 is controlled by a suitable plugging relay 30 having a normally closed contact 30a and an operating winding 30w which is connected in parallel with the resistor section 26a. Operation of the contactor 29 is controlled by a suitable accelerating relay 31 having a normally closed contact 31a and a series-type operating winding 31w which is connected in the short-circuiting loop completed by the contact 28b. The relay 31 is preferably of the type described in Trofimov Patent No. 1,980,736 and has its contact 31a mounted on a conducting tube 31b that moves upwardly to open the contact 31a upon an increase in current in the winding 31w and returns to the normally closed position shown after a time interval. Other types of plugging and accelerating relays than those shown may be used if desired.

The dynamic braking circuits to be described are controlled by suitable control means which includes the contacts 32a, 32b, 34a, and 34b, hereinafter described. Thus, in the illustrative example, the dynamic braking circuits are completed by selective closure of normally closed main contacts 32a and 32b of an electromagnetic forward braking contactor 32 and normally closed main contacts 34a and 34b of an electromagnetic reverse braking contactor 34. Any suitable means may be used to control the selective closure of the contactors 32 and 34 in accordance with the direction of motor rotation, but preferably for this purpose the contactors 32 and 34 are provided with polarizing windings 32p and 34p, respectively, as described and claimed in a copending application of J. D. Leitch and P. G. White, Ser. No. 736,146, filed March 21, 1947. The contactors 32 and 34 also have operating windings 32w and 34w, respectively, normally open auxiliary contacts 32c and 32d and 34c and 34d, respectively, and normally closed auxiliary contacts 32e and 34e, respectively. The windings 32p and 32w have a common magnetic circuit and the windings 34p and 34w also have a common magnetic circuit as indicated. Although each of the contactors 32 and 34 has been shown as a double-pole contactor, this has been done merely to simplify the drawing since usually two single-pole contactors would be used instead of one double-pole contactor.

A protective resistor 35 for the polarizing windings 32p and 34p is by-passed at slow motor speeds by a normally closed contact 36a of a counter-voltage relay 36 having an operating winding 36w, an additional normally closed contact 36b, and a normally open contact 36c. A protective resistor 38 for the windings 32w and 34w is by-passed before acceleration and during plugging by a normally open contact 39a of a time delay relay 39 having an operating winding 39w. Preferably the relay 39 is of the flux-decay type with the contact 39a being delayed in opening. Energization of the windings 32w and 34w is controlled by a normally open contact 40a of a braking control relay 40 having an additional normally open contact 40b and an operating winding 40w.

The dynamic braking circuits include cross-connections 41 and 42 between like polarity terminals, respectively, of the armature windings 10a and 11a and cross-connections 44 and 45 between like polarity terminals respectively, of the field windings 10b and 11b. Resistors 46 and 48 having respective center taps 46a and 48a are interposed in the cross-connections 41 and 42, respectively, and resistors 49 and 50 are interposed in series with each other in the cross-connection 44. Connections to be completed selectively for dynamic braking extend from the center-tap 46a through the contact 34b to the cross-connection 45 at a junction point 45a and through the contact 32a to the cross-connection 44 at a junction point 44a intermediate of the resistors 49 and 50. Likewise dynamic braking connections extend from the center-tap 48a through the contact 32b to the cross-connection 45 at the point 45a and through the contact 34a to the cross-connection 44 at the point 44a.

Figure 7:
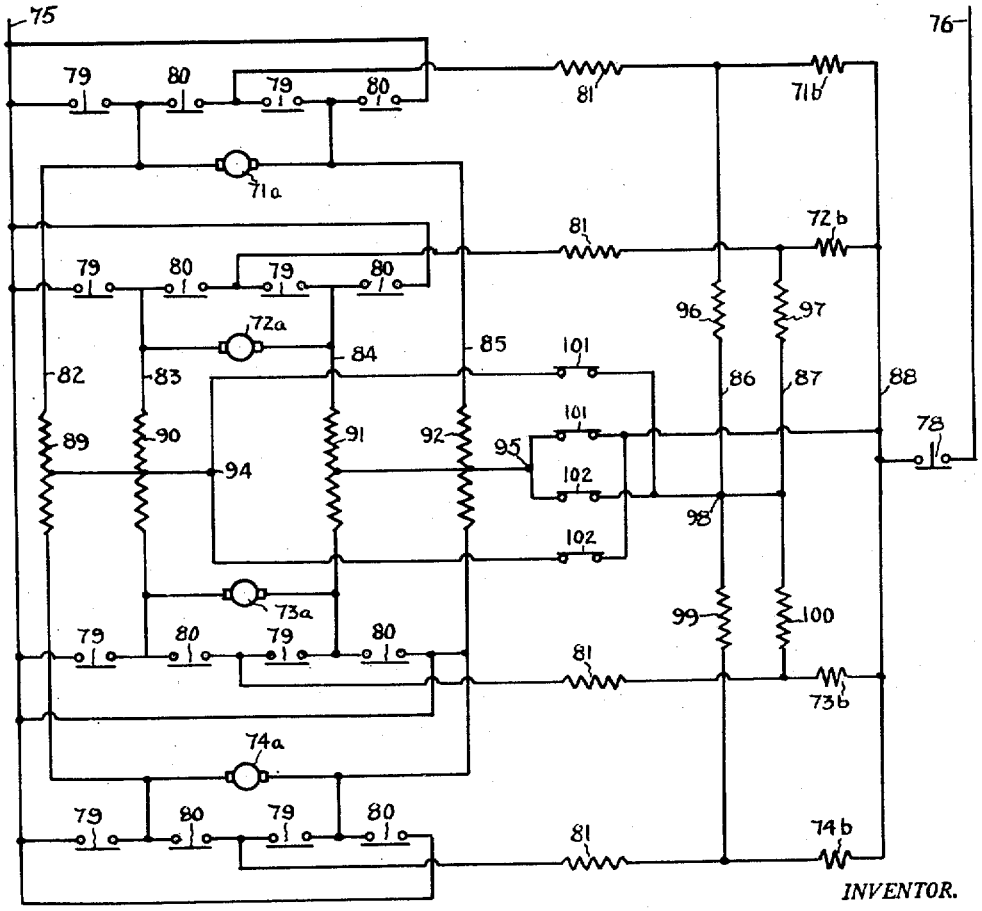
Fig. 7 is a simplified wiring diagram showing how Figs. 2 and 3 may be modified for controlling more than two motors.

It is to be noted that the mid-tap 46a is a common junction point for conductors leading from the left-hand armature terminals, the mid-tap 48a is a common junction point for conductors leading from the right-hand armature terminals, and that junction points 44a and 45a are common to the like polarity terminals of the field windings 10b and 11b, respectively. As shown in Fig. 7, more than two motors may be controlled by providing similar common junction points for like polarity armature and field terminals of all of the motors.

Portions 49a and 50a of the resistors 49 and 50, respectively, are arranged to be short-circuited by normally closed contacts 51a and 51b, respectively, of an electromagnetic contactor 51 having an operating winding 51w. Adjustable portions 49b and 50b of the resistors 49 and 50, respectively, are arranged to be short-circuited by normally closed contacts 52a and 54a, respectively, of electromagnetic contactors 52 and 54, respectively, which have respective series-type operating windings 52w and 54w interposed in the cross-connection 44 on opposite sides of the junction point 44a.

The direction of rotation and the speed of the motors 10 and 11 may be selected by a reversing master switch 55 (Fig. 3) having electrically interconnected contact segments 55a through 55j, inclusive, which are movable with respect to cooperating contact buttons 55n to 55t, inclusive. The master switch 55 has an off position and three forward and three reverse positions as indicated. A low voltage protection relay 56 having a normally open contact 56a and an operating winding 56w is associated with the master switch 55 and may be made responsive in the usual manner to the operation of overload relays (not shown).

Dynamic braking of the motors 10 and 11 may be controlled by a master switch 58 having electrically interconnected contact segments 58a, 58b, and 58c which are movable from an off position through two braking positions with respect to contact buttons 58d, 58e, and 58f, respectively.

A contactor 59 having an operating winding 59w has normally open main contacts 59a and 59b which complete when closed connections through resistors 60 and 61, respectively, to provide slight excitation for the field windings 10b and 11b, respectively, while the motors are drifting or coasting. This slight excitation insures that the relay 36 remains picked-up and the windings 32p and 34p remain energized during the coasting period and further insures that the field windings of the motors build up if the motors are braked after coasting.

Further understanding of the preferred construction and arrangement of the component parts of the controller of Figs. 2 and 3 may be had from the following description of operation:

First it is assumed that both of the motors 10 and 11 are to be operated together in the forward direction and then stopped by dynamic braking. With the knife switch 15 closed to energize the conductors 12 and 14, both motors are arranged for operation together when the knife switch 19 is in its upper closed position and the knife switch 20 is in its lower closed position.

With power supplied to the conductors 12 and 14 and both master switches 55 and 58 in their off positions as shown, energizing circuits (Fig. 3) are completed for the windings 39w, 40w, 51w, and 56w. The circuit for the winding 56w is from the conductor 12 through the contacts 36b, 55n, 55a, 55b, 55o, a conductor 64, and the winding 56w to the conductor 14. Energization of the winding 56w causes closure of the contact 56a to complete a circuit from the conductor 12 to the conductor 64 and the winding 56w which is independent of the position of the master switch 55. The circuit for the winding 51w is from the conductor 64 through the contacts 58d, 58a, 58b, and 58e through the winding 51w to the conductor 14. The contacts 51a and 51b upon energization of the winding 51w open and interrupt the short-circuiting paths around the resistor sections 59a and 50a, respectively (Fig. 2). The circuit for the winding 39w is from the conductor 64 through the contacts 32e and 34e in parallel, and the circuit for the winding 40w is from the conductor 64 through the master switch contacts 58d, 58a, 58c and 58f.

Energization of the winding 40w causes closure of the contacts 40a and 40b. Closure of the contact 40a completes a circuit for the windings 32w and 34w from the conductor 64 through the contact 39a which closed to by-pass the resistor 38 upon energization of the winding 39w. Energization of the windings 32w and 34w with the resistor 38 by-passed causes positive opening of the contacts 32a, 32b, 34a and 34b in the dynamic braking circuits. The contacts 32e and 34e also open to deenergize the winding 39w. After a short time delay, the contact 39a opens to reinsert the resistor 38 in series with the windings 32w and 34w, but the contactors 32 and 34 remain in their energized positions. The contacts 32d and 34d which closed upon energization of the windings 32w and 34w together with the now-closed contacts 40b partially complete circuits for the windings 21w and 22w.

If the master switch 55 is now moved to any of the forward positions, energizing circuits from the conductor 64 to the conductor 14 are completed for the windings 21w, 24w, and 59w. The circuit for the winding 21w includes the contacts 55o, 55b, 55d, 55q, 40b[;], 32d and 34d, and the circuits for the windings 24w and 59w include the contacts 55 [c] o, 55b, 55c, and 55p. The contacts 29c are also in the circuit for the winding 59w.

Energization of the winding 24w causes closure of the contact 24a which connects the motors 10 and 11 to the conductor 14 and causes closure of the contact 24b in an energizing circuit for the winding 28w. With the contact 24a closed, closure of the contacts 59a, 59b, 21a, 21b, 21c, and 21d upon energization of the windings 59w and 21w causes both motors to operate in the forward direction with respective armature shunt circuits of relatively high resistance. The contacts 21e, 21f, and 21g also close. The contact 21e insures that the windings 32w and 34w are energized when the winding 21w is energized, and the contact 21g partially completes the circuit for the winding 28w. Closure of the contact 21f completes a circuit for the winding 39w, but the response of the relay 39 is without operative effect at this time.

As soon as power is supplied to the motor 11, the voltage drop across its armature winding 11a causes energization of the winding 32p through the contacts 32c and 36a and energization of the winding 34p through the contacts 34c and 36a. The contacts 32c and 34c closed upon energization of the windings 32w and 34w. After the motor has reached a predetermined low speed, the winding 36w which is connected across the armature winding 11a becomes sufficiently energized by the counter-voltage of the motor 11 to open the contact 36a thereby to insert the resistor 35 in series with the windings 32p and 34p. Means may be provided in a well-known manner for protecting the winding 36w against overheating when subjected to the higher values of counter-voltage to permit the relay 36 to have a relatively low pick-up current value. With the motors operating in the forward direction, the flux produced by the winding 32p opposes that produced by the winding 32w and the flux produced by the winding 34p assists that produced by the winding 34w. The flux produced by the winding 32w, however, is sufficiently in excess of that produced by the winding 32p even at the maximum possible speed of the motor 11 that the contactor 32 remains in its picked-up or energized position.

It is assumed that the motors are accelerating from rest so that, when the master switch 55 reaches the second forward position, a circuit is completed without time delay for the winding 28w through the contacts 55e, 55s, 21g, 30a and 24b. Closure of the contacts 28a and 28b upon energization of the winding 28w short-circuits the resistor sections 25a and 26a, respectively, and increases the voltage applied to the motor armatures.

Completion of the short-circuiting loop including the contact 28b causes energization of the winding 31w of the relay 31 which responds to open its contact 31a. After a time delay interval dependent upon the amount of current flowing through the winding 31w during the interval, the contact 31a recloses. If the master switch is now moved to the third forward position or if it previously had been moved there, a circuit is completed for the winding 29w through the contacts 55f, 55t, 31a and 28c. Response of the contactor 29 to the energization of its winding 29w causes closure of the contacts 29a and 29b which exclude the remainder of the resistors 25 and 26 from the motor circuits, and causes opening of the contact 29c to deenergize the winding 59w. The contacts 59a and 59b thereupon open to interrupt the armature shunt circuits through the resistors 60 and 61.

Figure 1:
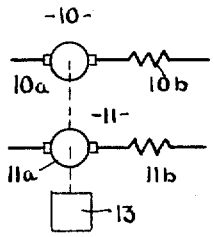
Figure 4:
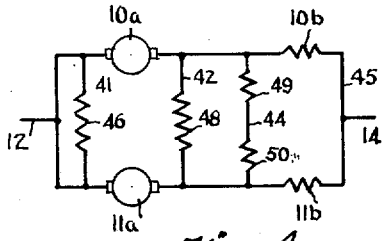
Fig. 4 is a simplified wiring diagram showing the power circuits that are energized when both motors of Figs. 1 and 2 are operating as motors.

The motors 10 and 11 are now operating in the forward direction at their maximum speed for a given load and the motor circuits are as shown in Fig. 4. When so operating, the resistors 48, 49, and 50 serve to minimize any circulating currents in the cross-connections 42 and 44 resulting from possible differences in voltage drops across the armatures 10a and 11a. When the motors are reversed, the resistors 46, 49 and 50 operate to minimize such currents in the cross connections 41 and 44. Only the portions 49b and 50b of the resistors 49 and 50 are short-circuited during normal running of the motors. If care is taken to make the resistances of the two field circuits substantially equal to each other, the currents in the field windings 10b and 11b are substantially equal, and the load is satisfactorily distributed between the two motors.

If at any time while the motors are operating in the forward direction, it is desired to effect a braking operation, the master switch 58 may be moved to its first braking position. This effects deenergization of the winding 40w and consequent opening of the contacts 40a and 40b. Opening of the contact 40b deenergizes the winding 21w and the contactor 21 returns to its normal position. Opening of the contacts 40a and 21e deenergizes the windings 32w and 34w. The contactor 34 remains in its energized or picked-up position due to the flux produced by the winding 34p. Since the flux produced by the winding 32p is opposed to that produced by the winding 32w before deenergization of the latter winding, the flux in the contactor 32 reaches zero and the contactor 32 drops out. Opening of the contact 32c prevents further energization of the winding 32p and increases the voltage applied to the winding 34p.

Figure 5:
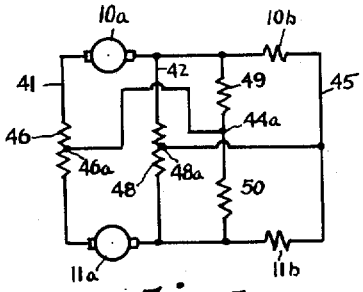
Figs. 5 and 6 are simplified wiring diagrams showing the power circuits that are energized when both motors of Figs. 1 and 2 are being braked dynamically from forward and reverse directions, respectively.

Closure of the contacts 32a and 32b upon drop-out of the contactor 32 completes the following dynamic braking circuit for the motor 10: from the left-hand terminal of the armature winding 10a, the knife switch pole 19b, the upper portion of the resistor 46 to the mid-tap 46a, the contact 32a, the point 44a on the cross-connection 44, the winding 52w, the contact 52a, a portion of the resistor 49, the knife switch poles 19e and 19f, the field winding 10b, the knife switch pole 19g, the point 45a on the cross-connection 45, the contact 32b, the mid-tap 48a, the upper portion of the resistor 48, and the knife switch pole 19c to the right-hand terminal of the armature winding 10a. The following dynamic braking circuit for the motor 11 is also completed: from the left-hand terminal of the armature winding 11a, the knife switch pole 20b, the lower portion of the resistor 46 to the mid-tap 46a, the contact 32a, the point 44a on the cross-connection 44, a portion of the resistor 50, the contact 54a, the winding 54w, the knife switch poles 20e and 20f, the field winding 11b, the knife switch pole 20g, the point 45a on the cross-connection 45, the contact 32b, the lower portion of the resistor 48, and the knife switch pole 20c to the right-hand terminal of the armature winding 11a. The motors are now connected as shown in Fig. 5.

Since the braking circuit for the motor 10 contains no part of the motor 11 and the braking circuit for the motor 11 contains no part of the motor 10, an open circuit in one of the motors does not interfere with proper braking of the other motor.

With the master switch 58 in the first position, the contacts 51a and 51b are open and the resistor sections 49a and 50a are effective in the respective dynamic braking circuits. As soon as dynamic braking current flows in the cross-connection 44, the contacts 52a and 54a open due to current flowing through the windings 52w and 54w. When the contacts 52a and 54a open, the resistor sections 49b and 50b become effective in the dynamic braking circuit. The resulting decrease in the dynamic braking current causes the contacts 52a and 54a to reclose. Reclosing of the contacts 52a and 54a results in an increase in current and the contacts reopen. The contacts 52a and 54a thus open and close in rapid succession until a low speed of the motors 10 and 11 is reached at which time the dynamic braking current is too low to cause further operation of the contactors 52 and 54. Final stopping of the motors 10 and 11 is effected with the dynamic braking circuits including only the resistors 46 and 48 and the portions of the resistors 49 and 50 not bypassed by the contacts 52a and 54a.

The contactors 52 and 54 are preferably designed with pick-up and drop-out current values so related to the resistance of the resistor portions 49a and 50a and the expected value of dynamic braking current that each contactor opens and closes several times during dynamic braking. By making the contactors 52 and 54 very rapid in operation, it is possible to limit the dynamic braking current to a predetermined value at the start of braking and to maintain the average value of the current but slightly below the predetermined value throughout a major portion of the braking cycle.

When the master switch 58 is moved to the second braking position, the winding 51w is deenergized and the contacts 51a and 51b close. Stronger braking is thereby produced since the resistor sections 49a and 50a are excluded from the braking circuits. The contacts 52a and 54b open and close repeatedly as before to graduate the braking current and torque during the stopping interval.

When the motors 10 and 11 reach a predetermined low speed, the contact 36a of the relay 36 closes and short-circuits the resistor 35 so as to connect the winding 34p directly across the armature winding 11a. Thus the contactor 34 remains in its energized position until a very low motor speed is reached. Preferably the contactors 32 and 34 have low drop-out current values so that the dynamic braking circuits remain completed as long as possible.

If the master switch 55 is moved to the reverse positions instead of the forward positions, operation during acceleration is the same as above described except that the winding 22w instead of the winding 21w is energized. The circuit for the winding 22w includes the contacts 55h, 55r, 40b, 32d, and 34d. Due to the reversal of counter-E. M. F. of the motors 10 and 11 for reverse operation, the flux produced by the winding 32p now assists that produced by the winding 32w whereas the flux produced by the winding 34p during reverse operation opposes but is less than that produced by the winding 34w. Consequently when the windings 32w and 34w are deenergized, the contactor 32 remains in its picked-up position due to the flux produced by the winding 32p and the contactor 34 drops out because its flux is reduced to zero. The contactors 51, 52, and 54 respond during reverse braking in the manner described above for forward braking.

Figure 6:
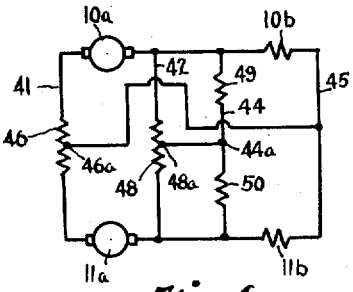

The reverse braking circuit for the motor 10 is through the upper portion of the resistor 48 to the mid-tap 48a, the contact 34a, the point 44a, the winding 52w, the resistor 49, the field winding 10b, the point 45a, the contact 34b, and the upper portion of the resistor 46 to the left-hand terminal of the armature winding 10a. The reverse braking circuit for the motor 11 is through the lower portion of the resistor 48, the contact 34a, the point 44a, the resistor 50, the winding 54w, the field winding 11b, the point 45a, the contact 34b, and the lower portion of the resistor 46 to the left-hand terminal of the armature winding 11a. The motors are now connected as shown in Fig. 6.

If the motors 10 and 11 should be plugged from either direction of rotation, the relay 30 opens its contacts 30a to prevent energization of the contactor 28 until the motors approach standstill. Acceleration then proceeds as before. When the motor 11 is plugged, the voltage across the armature 11a becomes greater than the voltage between the conductors 12 and 14. To prevent the flux of the windings 32p and 34p from exceeding that produced by the windings 32w and 34w during plugging, the winding 39w of the relay 39 is energized when the contacts 21f or 22f, and the contacts 28d are closed. The contact 39a thus closes during plugging to exclude the resistor 38 from the energizing circuit for the windings 32w and 34w thereby increasing the flux produced by those windings so as to maintain the necessary excess flux.

If it is desired for any reason to disconnect the motor 10 from the circuit, the knife switch 19 may be moved from its upper closed position to its lower closed position. With the knife switch 19 in its lower closed position, the poles 19d and 19f connect the resistor 25 in parallel with the resistor 26. This increases the torque exerted by the motor 11 when the master switch 55 is in the first two positions which is desirable since the motor 11 is now driving alone the same load normally driven by both motors. As is clear from Figs. 2, 5, and 6, opening of the circuit to the motor 10 has not altered the dynamic braking circuit for the motor 11 and the motor 11 may be stopped by dynamic braking in the same manner as described for two-motor operation.

If the knife switch 20 is moved to its upper closed position while the knife switch 19 is in its upper closed position, the motor 11 is disconnected from the circuit and the resistors 25 and 26 are in parallel with each other through the knife switch poles 20d and 20f and both resistors are in series with the motor 10. Thus the relays 30 and 31 can function to control plugging and acceleration of the motor 10 alone. Moving of the knife switch 20 to its upper closed position connects the windings 31w, 32p, and 34p across the armature 10a through the knife switch poles 20h and 20i and does not alter the dynamic braking circuit of the motor 10.

If the knife switch poles 19e and 20e are omitted, the resistors 49 and 50 would be in parallel during braking if one of the motors were disconnected from the circuit. The resulting stronger braking torque for the single remaining motor may be desirable for some applications.

If power should fail at any time during operation of either one or both of the motors, the relay 56 opens its contacts 56a to deenergize the conductor 64. With the conductor 64 deenergized, all of the contactors and relays return to their normal positions except the relay 36 and the proper dynamic braking contactor 32 or 34 depending upon the direction of motor rotation. Braking action thus proceeds as if the master switch 58 had been moved to its second position. During the short interval between the time that power is removed from the armature winding 11a until the dynamic braking circuit for the motor 11 is established, the winding 34p is energized by the counter-voltage resulting from the residual magnetism in the field of the motor 11. The fact that the contacts 36b are open during braking insures that power cannot be reapplied to the motors after a power failure until the motors reach a low speed.

The circuits through the contacts 59a and 59b of the contactor 59 and the resistors 60 and 61, provide a small excitation of the field winding 10b and 11b, respectively, while the motors are coasting, that is, while the motors are rotating with power removed from the armatures and the dynamic braking circuits interrupted. This insures build-up of the motor field strength when braking connections are established and insures that the relay 36 and the contactors 32 and 34 remain picked-up while coasting. It is to be noted that since the field windings 10b and 11b are in parallel during braking, the build up of one field causes build up of the other.

Fig. 7 shows how the control system of Figs. 2 and 3 may be modified to control more than two motors without an increase in the number of dynamic braking contacts. In Fig. 7 a plurality of motors having armature windings 71a, 72a, 73a, and 74a and respective field windings 71b, 72b, 73b, and 74b are arranged to be connected in parallel with each other and to be supplied from a suitable power source indicated by the conductors 75 and 76. A normally-open contact 78 when closed connects the motors to the conductor 76, and a plurality of normally-open contacts 79 when closed connect the several armature windings for forward operation of the motors while a plurality of normally-open contacts 80 control reverse operation of the motors. The contacts 78, 79, and 80 may be contacts of electromagnetic contactors and correspond to the main contacts [to] of the contactors 21, 22, and 24 of Fig. 2. Accelerating resistors 81 for the motors of Fig. 7, respectively, are provided and may be regulated in any suitable manner.

The dynamic braking connections include cross connections 82 and 88, inclusive. The cross connection 82 is between the left-hand terminal of the armature winding 71a and the left-hand terminal of the armature winding 74a, and the cross connection 85 is between the right-hand terminals of these two armature windings. Likewise, the cross connections 83 and 84 are between opposite terminals of the armature winding 72a and 73a. The cross connection 86 is between the left-hand terminals of the field winings 71b and 74b and the cross connection 87 is between the left-hand terminals of the field windings 72b and 73b. The right-hand terminals of each of the field windings are interconnected by the cross connection 88.

Resistors 89, 90, 91, and 92 are interposed in the cross connections 82, 83, 84, and 85 respectively. Mid-taps of the resistors 89 and 90 are connected to a common junction point 94 and mid-taps of the resistors 91 and 92 are connected to a common junction point 95. Resistors 95 and 97 are interposed in the cross connections 86 and 87, respectively, on one side of a junction point 98 common to the cross connections 86 and 87, and resistors 99 and 100 are interposed in the cross connections 86 and 87, respectively, on the opposite side of the junction point 98. The resistors 96 and 97 correspond to the resistor 49 of Fig. 2 and the resistors 99 and 100 correspond to the resistor 50 of Fig. 2 and may be regulated in any suitable manner, but preferably in the manner disclosed in Fig. 2.

For controlling dynamic braking in dependence upon the direction of motor rotation, two normally-closed contacts 101 and two normally closed contacts 102 are provided. The contacts 101 connect the motors for braking after a forward operation, and the contacts 102 connect the motors for braking after a reverse operation. The contacts 101 and 102 correspond to the main contacts of the contactors 32 and 34 of Fig. 2, respectively. Means may be added to Fig. 7 in a manner hereinabove explained to disconnect any one or more of the motors while permitting the remaining motors to operate.

With the contacts 101 closed and the contacts 102 open the motors are connected for dynamic braking if they have been running in the forward direction. Current flows from the armature 71a through the upper portion of the resistor 89, the junction point 94, one of the contacts 101, the resistor 96, the field winding 71b, the cross-connection 88, the remaining contact 101, the junction point 95, and the upper portion of the resistor 92 to the armature 71a. Current supplied from the armature winding 71a thus excites the field winding 71b to produce dynamic braking action. The dynamic braking circuits for the remaining motors may be traced in a similar manner. If the motors are operating in the reverse direction the contacts 102 are closed while the contacts 101 are open and similar dynamic braking circuits for each of the motors are completed. It is thus seen that, irrespective of the number of motors, only four dynamic braking contacts are required in order to complete the necessary dynamic braking circuits for braking from either direction of motor rotation.

Thus having described my invention, I claim:

1. A dynamic braking control system comprising a plurality of direct current motors each having an armature winding and a series field winding, switching means for connecting the windings of each motor in series with each other and said motors in parallel with each other across a source of power for operation thereof as series machines with terminals of like polarity of said armature windings at substantially the same potential and terminals of like polarity of said field windings at substantially the same potential, said switching means including means for reversing said motors concurrently, armature cross connections connecting said armature terminals of like polarity to common armature junction points, respectively, field cross connections connecting said field terminals of like polarity to common field junction points, respectively, a first pair of dynamic braking connections respective to said common field junction points and independently connecting their associated field junction points with one of said common armature junction points, a second pair of dynamic braking connections respective to said common field junction points and independently connecting their associated field junction points with the other one of said common armature junction points, and control means for making and breaking said dynamic braking connections selectively.

2. A dynamic braking control system in accordance with claim 1 characterized in that said control means includes contact means interposed in said dynamic braking connections, respectively, and is operative to interrupt all of said dynamic braking connections when said motors are operating as motors.

3. A dynamic braking control system in accordance with claim 2 characterized in that said control means includes operating means operative to complete a selected pair of said dynamic braking connections upon cessation of power supply to said motors while maintaining the remaining pair of said dynamic braking connections interrupted.

4. A dynamic braking control system in accordance with claim 3 characterized in that said operating means is operative to close some of said contact means upon cessation of power supply to said motors while maintaining the remaining contact means open and includes means responsive to the direction of rotation of said motors to select which of said contact means are to be closed and which are to remain open.

5. A dynamic braking control system in accordance with claim 1 characterized in that means are provided for disconnecting one of said motors from the source of power independently of the operation of said switching means while maintaining said dynamic braking connections connected with the windings of a remaining one of said motors through a portion of each of said armature cross connections, and a portion of each of said field cross-connections, thereby providing dynamic braking loop circuits for said remaining one of the motors.

6. A dynamic braking control system in accordance with claim 1 characterized in that said armature cross-connections define a closed armature loop circuit that is completed at all times while said motors are operating and which loop circuit includes two of said armature windings, both of said armature junction points, and resistor means.

7. A dynamic braking control system in accordance with claim 6 characterized in that said field cross-connections define a closed field loop circuit that is completed at all times while said motors are operating and which loop circuit includes two of said field windings, two of said field junction points, and resistor means.

8. A dynamic braking control system in accordance with claim 7 characterized in that means are provided for varying said resistor means.

9. A dynamic braking control system in accordance with claim 7 characterized in that means are provided for short circuiting at least a portion of one of said resistor means, and comprise a contact normally held closed to by-pass a portion of said one resistor means, a coil in series with said one resistor means in the cross-connection containing said one resistor means between the common junction point and motor terminal of said cross-connection, said contact being responsive to current flowing in said winding to open said short-circuit.

10. A dynamic braking control system in accordance wtih claim 1 characterized in that resistors are interposed in said armature cross-connections between said common armature junction points and said armature terminals, respectively.

11. A dynamic braking control system in accordance with claim 10 characterized in that a resistor means is interposed in those of said field cross-connections which are connected to those like polarity terminals of said field windings closest in potential to said armature terminals.

12. The combination with a pair of direct current motors each having an armature winding and a series field winding, the windings of each motor being connected in series with each other, and said motors being connected as series machines in parallel with each other across a source of power with terminals of like polarity of the armature windings at substantially the same potential and terminals of like polarity of the field windings at substantially the same potential, armature cross connections between the terminals of like polarity of the armature windings, respectively, and field cross-connections between the terminals of like polarity of the field windings, respectively, of a first switch means for completing dynamic braking connections between one of said armature cross-connections and one of said field cross-connections and independently between the other of said armature cross-connections and the other of said field cross-connections, respectively, a second switch means for completing dynamic braking connections between said one of said armature cross-connections and said other of said field cross-connections and independently between said other of said armature cross-connections and said one of said field cross-connections, respectively, and motor-rotation-direction responsive means for controlling selectively the operation of said switch means.

13. A dynamic braking control system for a pair of direct current motors each having an armature winding and a series field winding, means for connecting the windings of each motor in series with each other and the motors in parallel with each other across a source of power with terminals of like polarity of the armature windings at substantially the same potential and terminals of like polarity of the field windings at substantially the same potential, said means including means for reversing the motors concurrently, means for completing armature cross-connections between the terminals of like polarity of the armature windings, respectively, means for completing field cross-connections between the terminals of like polarity of the field windings, respectively, switch means for completing dynamic braking connections between one of said armature cross-connections and said field cross-connections, respectively, and switch means for completing dynamic braking connections between the other of said armature cross-connections and said field cross-connections, respectively.

14. A dynamic braking control system in accordance with claim 13 characterized in that a motor-rotation-direction responsive means is operatively associated with all of said switch means for controlling selective operation of all of said switch means.

15. In a dynamic braking control system for a plurality of direct current motors to be operated in parallel and each having an armature winding and a series field winding, a closed loop circuit, two pairs of normally-closed contacts connected in series with each other in a relation, as to each other, in which, in said loop circuit each contact of each pair is next adjacent and between the contacts of the other pair, the contacts of each pair being operable concurrently, junction points in said circuit between adjacent contacts, respectively, a first group of resistors each resistor of which has one of its terminals connected to one of said junction points, a second group of resistors each resistor of which has one of its terminals connected to another of said junction points, said one and said another of said junction points having only one contact of each pair of contacts interposed therebetween in each direction around the loop, the other terminals of each resistor in said first group of resistors being arranged for connection, respectively, to terminals of like polarity of the armature windings of said motors, and the other terminals of each of said resistors of said second group of resistors being arranged to be connected, respectively, to the other armature terminals, which are of opposite polarity from said first armature terminals of like polarity, means for connecting one of the remaining two junction points to field terminals of like polarity, respectively, of said motors, and means for connecting the other of the remaining two junction points to the other field terminals which are of oppositely polarity from said first field terminals of like polarity.

16. A dynamic braking control system for a direct current motor having an armature winding and a series field winding and comprising a dynamic braking resistor, means for completing a closed loop circuit in which said armature winding, said field winding, and said resistor are connected in series with each other, an electromagnetically operated contactor having normally closed contacts by-passing said resistor, an operating coil for said contactor connected in said loop circuit in series with said resistor and said contacts and adapted to effect opening of said contacts when the current in said circuit increases to a predetermined value, and said contactor being operative to reclose its contacts when the current in said circuit returns to a given value less than said predetermined value.

17. A dynamic braking control system in accordance with claim 1 characterized in that said armature cross-connections define closed armature loop circuits each including two of said armature windings, both of said armature junction points, and resistor means.

18. A dynamic braking control system *in accordance with claim 1* characterized in that said field cross-connections define closed field loop circuits, each including two of said field windings, both of said field junction points, and resistor means.

19. The combination of claim 12 characterized in that said motor-rotation-direction responsive means includes means operative to cause one of said switch means to complete its respective dynamic braking connections upon cessation of power supply to said motors while maintaining the other of said switch means inoperative to complete its respective dynamic braking connections.

20. A dynamic braking control system in accordance with claim 16 characterized in that said contactor has drop-out and pick-up values so related to the ohmic value of said resistor and the voltage generated by said motor when rotating with said loop circuit completed that said contactor repeatedly opens and closes during a braking cycle.

21. A dynamic braking control system in accordance with claim 1 characterized in that all of said cross-connections are maintained completed at all times while said motors are operating and in that means are provided for disconnecting one of said motors from the source of power independently of the operation of said switching means while maintaining said dynamic braking connections connected with the windings of a remaining one of said motors through a portion of each of said armature cross-connections, and a portion of each of said field cross-connections, thereby providing dynamic braking loop circuits for said remaining one of the motors.

ALVIN C. DYER.

REFERENCES CITED

The following references are of record in the file of this patent or the original patent:

UNITED STATES PATENTS

| Number | Name | Date |
|---|---|---|
| 1,231,605 | Hellmund | July 3, 1917 |
| 1,699,748 | North | Jan. 22, 1929 |
| 1,985,706 | Wilson et al. | Dec. 25, 1934 |
| 2,046,970 | Royer | July 7, 1936 |
| 2,128,034 | Austin | Aug. 23, 1938 |
| 2,248,577 | McNairy | July 8, 1941 |